US012795630B2

(12) United States Patent
Hu et al.

(10) Patent No.: US 12,795,630 B2
(45) Date of Patent: Nov. 10, 2026

(54) CAPABILITY INDICATION METHOD AND APPARATUS, AND DEVICE AND STORAGE MEDIUM

(71) Applicant: Beijing Xiaomi Mobile Software Co., Ltd., Beijing (CN)

(72) Inventors: Ziquan Hu, Beijing (CN); Xuhua Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 260 days.

(21) Appl. No.: 18/719,208

(22) PCT Filed: Dec. 15, 2021

(86) PCT No.: PCT/CN2021/138449
§ 371 (c)(1),
(2) Date: Jun. 12, 2024

(87) PCT Pub. No.: WO2023/108497
PCT Pub. Date: Jun. 22, 2023

(65) Prior Publication Data

US 2025/0056517 A1 Feb. 13, 2025

(51) Int. Cl.

| | |
|---|---|
| ***H04W 76/20*** | (2018.01) |
| ***H04W 72/0457*** | (2023.01) |
| ***H04W 72/12*** | (2023.01) |
| ***H04W 72/51*** | (2023.01) |

(52) U.S. Cl.
CPC ....... *H04W 72/0457* (2023.01); *H04W 72/12* (2013.01); *H04W 72/51* (2023.01); *H04W 76/20* (2018.02)

(58) Field of Classification Search
CPC . H04W 72/0457; H04W 76/20; H04W 72/51; H04W 72/12
USPC .......................................................... 370/329
See application file for complete search history.

(56) References Cited

FOREIGN PATENT DOCUMENTS

| | | | | |
|---|---|---|---|---|
| CN | 110972267 A | | 4/2020 | |
| CN | 112351496 A | | 2/2021 | |
| CN | 113196824 A | | 7/2021 | |
| CN | 113676957 A | | 11/2021 | |
| EP | 4113875 A1 | * | 1/2023 | ........ H04W 72/0453 |
| WO | 2019154209 A1 | | 8/2019 | |
| WO | 2019214452 A1 | | 11/2019 | |

OTHER PUBLICATIONS

Translation of CN 113676957.*
"UE complexity reduction for Redcap UE," Proceedings of the 3GPP TSG-RAN WG4 Meeting # 100-e, OPPO, R4-2113285, Aug. 16, 2021, Electronic Meeting, 3 pages.

* cited by examiner

*Primary Examiner* — Christopher R Crompton
(74) *Attorney, Agent, or Firm* — McCoy Russell LLP

(57) ABSTRACT

A method for indicating capability includes: a reduced capability (RedCap) user equipment (UE) sending indication information to a network device, where the indication information indicates whether the RedCap UE has the capability for supporting rapid bandwidth part (BWP) switching, and the rapid BWP switching refers to BWP switching for changing central frequency point, such that the network device determines the capability supported by the RedCap UE.

20 Claims, 5 Drawing Sheets

CAPABILITY INDICATION METHOD AND APPARATUS, AND DEVICE AND STORAGE MEDIUM

CROSS-REFERENCE

The present application is a U.S. National Stage of International Application No. PCT/CN2021/138449, entitled "CAPABILITY INDICATION METHOD AND APPARATUS, AND DEVICE AND STORAGE MEDIUM," and filed on Dec. 15, 2021, the contents of all of which are incorporated herein by reference in their entireties for all purposes.

BACKGROUND OF THE INVENTION

In a mobile communication technology, a terminal supports operating within a certain bandwidth range and may switch operation bandwidths in the bandwidth range according to different executed services. At present, a low-capability user equipment (UE), also called reduced capability (RedCap) UE, is provided, and there is an urgent need for a BWP switching method suitable for the RedCap UE.

SUMMARY OF THE INVENTION

According to an aspect of the disclosure, a method for indicating capability is provided, performed by a RedCap UE and including:

- sending indication information to a network device, where the indication information indicates whether the RedCap UE has a capability for supporting rapid BWP switching, and the rapid BWP switching refers to BWP switching for changing central frequency point.

According to an aspect of the disclosure, a method for indicating capability is provided, performed by a network device and including:

- receiving indication information sent by a RedCap UE, where the indication information indicates whether the RedCap UE has a capability for supporting rapid BWP switching, and the rapid BWP switching refers to BWP switching for changing central frequency point.

According to an aspect of the disclosure, a RedCap UE is provided, including: a processor; a transceiver connected with the processor; and a memory configured to store an instruction executable by the processor; where the processor is configured to load and perform the executable instruction so as to implement: sending indication information to a network device, where the indication information indicates whether the RedCap UE has a capability for supporting rapid bandwidth part (BWP) switching, and the rapid BWP switching refers to BWP switching for changing central frequency point.

According to an aspect of the disclosure, a network device is provided, including: a processor; a transceiver connected with the processor; and a memory configured to store an instruction executable by the processor; where the processor is configured to load and perform the executable instruction so as to implement the method for indicating in the above aspect.

DETAILED DESCRIPTION OF THE INVENTION

In order to make objectives, technical solutions and advantages of the disclosure clearer, implementations of the disclosure will be further described in detail below with reference to the accompanying drawings.

The examples will be described in detail here, and their instances are represented in the accompanying drawings. Unless otherwise indicated, when the following description refers to the accompanying drawings, the same number in the different accompanying drawings represents the same or similar elements. Implementations described in the following examples do not represent all implementations consistent with the disclosure. Rather, they are merely examples of an apparatus and method consistent with some aspects of the disclosure as detailed in the appended claims.

Terms used in the disclosure are merely intended to describe specific examples but not to limit the disclosure. "A/an", "the" and "said" in a singular form used in the disclosure and the appended claims are also intended to include a plural form unless other meanings are indicated clearly in the context. It is to be further understood that a term "and/or" used here refers to and contains any one or all possible combinations of one or a plurality of associated listed items.

It is to be understood that various information, possibly described by using terms such as first, second and third in the disclosure, is supposed not to be limited to these terms. These terms are merely used for distinguishing the same type of information. For example, without departing from the scope of the disclosure, first information may also be called second information, and similarly, the second information may also be called the first information. Depending on the context, words such as "if" and "in the case that" used here may be construed as "when . . . ", or "while . . . " or "in response to determining".

The disclosure relates to the field of mobile communications, in particular to a method and apparatus for indicating capability, and a device and a storage medium.

The RedCap UE switches a bandwidth part (BWP) in the same BWP switching way as other terminals, which results in that since a switching delay of the RedCap UE is long, transmission performance is affected, and thus there is an urgent need for a BWP switching method suitable for the RedCap UE.

An application scene of the disclosure is described below.

Figure 1:
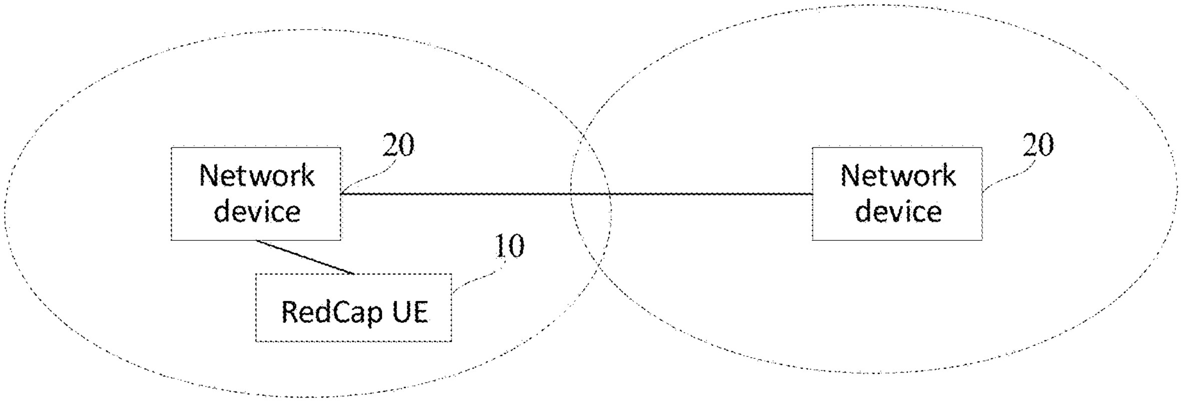
FIG. 1 shows a block diagram of a communication system provided by an example of the disclosure.

FIG. 1 shows a block diagram of a communication system provided by an example of the disclosure. The communication system may include: a RedCap UE 10 and a network device 20.

With development of the communication technology, in order to adapt to a new communication scene, a reduced capability user equipment is proposed in the related art, which is called RedCap UE for short or NR-lite, and this type of terminal usually needs to meet conditions of low cost, low complexity, coverage enhancement to a certain degree, power saving and the like. Compared with the RedCap UE, a common terminal is called a Non-RedCap UE or legacy UE, which has a certain difference. The RedCap UE 10 may include various hand-held devices, vehicle-mounted devices, wearable devices, computing devices or other processing devices connected to a radio modem, which have a wireless communication function, user equipment (UE) and mobile stations (MSs) in various forms, etc.

There are a plurality of RedCap UEs 10 in general, and one or a plurality of RedCap UEs 10 may be distributed in a cell managed by each network device 20. For convenient description, in the examples of the disclosure, the devices mentioned above are collectively called the RedCap UE.

The network device 20 is an apparatus which is deployed in an access network and configured to provide a wireless communication function for the RedCap UE 10. The network device 20 may include various forms of a macro site, a micro site, a relay station, an access point, etc. In a system adopting different wireless access technologies, names of the devices having a network device function may be different, for example, the device is called, in a 5G NR system, gNodeB or gNB. With evolution of the communication technology, the name "network device" may change. For convenient description, in the examples of the disclosure, the apparatuses for providing the wireless communication function for the RedCap UE 10 are collectively called the network device. The network device 20 and the RedCap UE 10 may establish a connection between each other through radio and thus communicate through the connection, including signaling and data interaction. There may be a plurality of network devices 20, and every two adjacent network devices 20 may communicate in a wired or wireless mode. The RedCap UE 10 may be switched between different network devices 20, namely establishing a connection with the different network devices 20.

"5G NR system" in the example of the disclosure may also be called a 5G system or NR system, but those skilled in the art may understand its meaning. The technical solutions described in the examples of the disclosure are suitable for the 5G NR system and also suitable for a subsequent evolution system of the 5G NR system.

Figure 2:
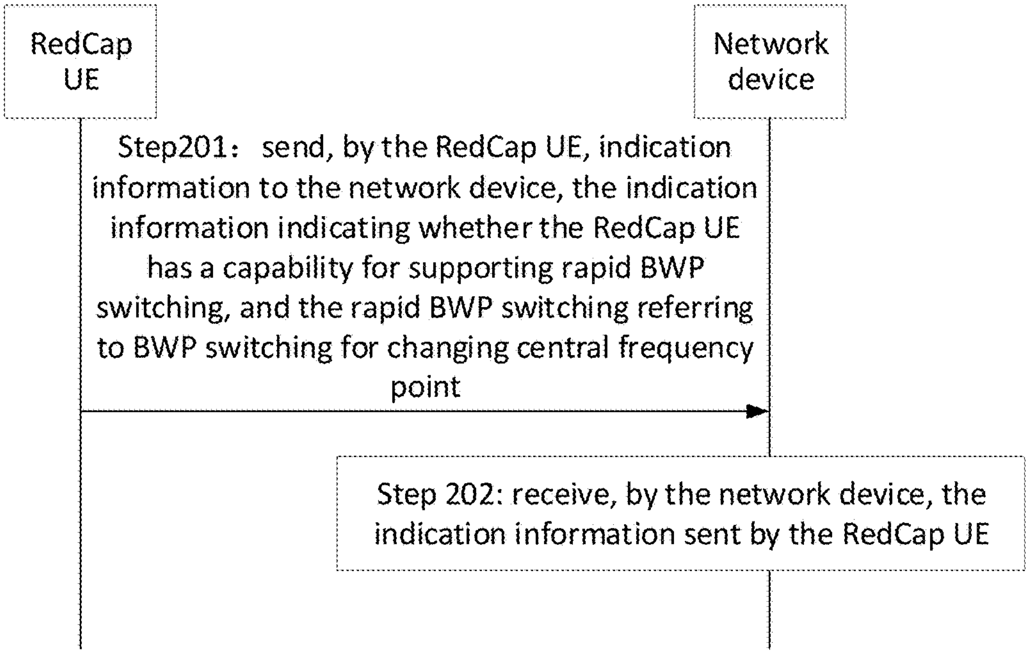
FIG. 2 shows a flowchart of a method for indicating capability provided by an example of the disclosure.

FIG. 2 shows a flowchart of a method for indicating capability provided by an example of the disclosure, which may be, for example, applied to the RedCap UE and the network device shown in FIG. 1. The method includes at least part of the following contents.

Step 201: the RedCap UE sends indication information to the network device, the indication information indicating whether the RedCap UE has a capability for supporting rapid BWP switching, and the rapid BWP switching referring to BWP switching for changing central frequency point.

In some examples, a bandwidth supported by the RedCap UE is less than 20 MHz in the case of a frequency range 1 (FR1) and less than 100 megahertz (MHz) in the case of a frequency range 2 (FR2).

It needs to be noted that the examples of the disclosure are merely described as specific examples, and in another example, the bandwidth supported by the RedCap UE is less than a first threshold. The first threshold is defined by a communication protocol or set by a developer or set in another manner.

In some examples, the first threshold is 20 megahertz (MHz) in the case of the frequency range 1 (FR1) and is 100 MHz in the case of the frequency range 2 (FR2). Alternatively, the first threshold may also be another value, which is not limited in the example of the disclosure.

In the example of the disclosure, the RedCap UE may have the capability of rapid BWP switching or not, whether the RedCap UE has the capability of rapid BWP switching may affect a duration of BWP switching of the RedCap UE, and the network device needs to schedule resources based on the duration of BWP switching of the RedCap UE, so the RedCap UE sends the indication information to the network device and indicates whether the RedCap UE has the capability of rapid BWP switching to the network device through the indication information.

In some examples, the RedCap UE having the capability of rapid BWP switching refers to when the RedCap UE performs BWP switching, BWP switching changes a frequency point without changing other parameters.

Figure 3:
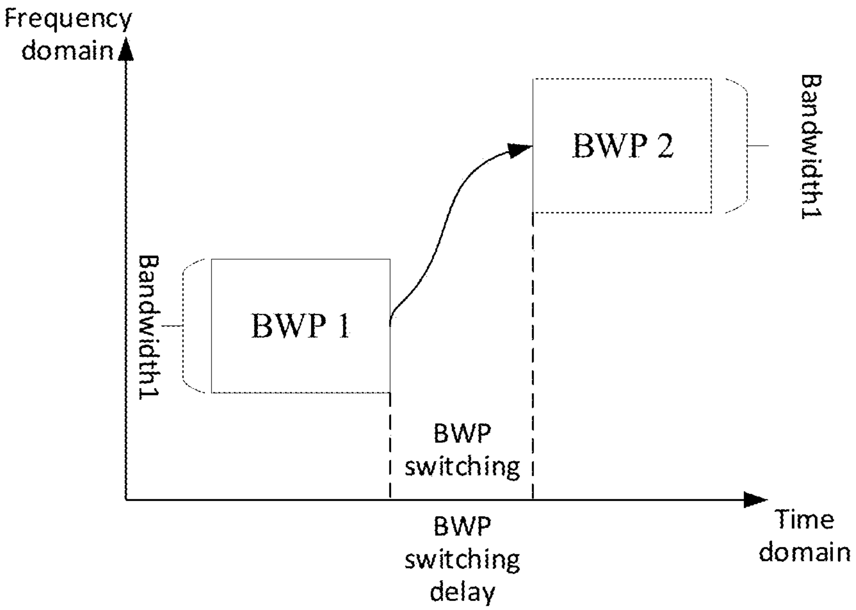
FIG. 3 shows a schematic diagram of BWP switching provided by an example of the disclosure.

In the example of the disclosure, the RedCap UE has a certain operation bandwidth range and may need to frequently perform BWP switching based on the frequency point due to service demands, and as shown in FIG. 3, the RedCap UE may perform switching of changing a central frequency point and not changing a bandwidth. Referring to FIG. 3, when the RedCap UE performs BWP switching, BWP1 needs to be switched to BWP2, BWP1 and BWP2 have the same bandwidth but different central frequency points, and a BWP switching delay which is spent on BWP switching of the RedCap UE is between BWP1 and BWP2 in FIG. 3.

In some examples, the RedCap UE having no capability of rapid BWP switching refers to when the RedCap UE performs BWP switching, BWP switching not only changes the frequency point, but also changes other parameters. The other parameters may be a bandwidth, a subcarrier spacing or other parameters. Alternatively, the RedCap UE having no capability of rapid BWP switching refers to when the RedCap UE performs BWP switching, the bandwidth or the subcarrier spacing may be changed without changing the frequency point.

Figure 4:
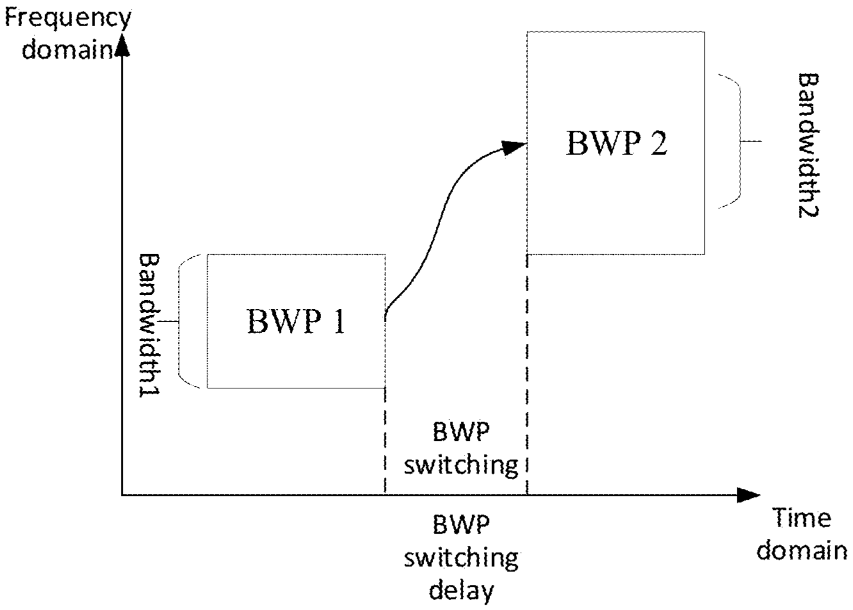
FIG. 4 shows a schematic diagram of BWP switching provided by an example of the disclosure.

In the example of the disclosure, the RedCap UE has a certain operation bandwidth range and may need BWP switching based on a non-frequency point due to service demands, and as shown in FIG. 4, the RedCap UE may perform switching of changing the central frequency point and the bandwidth. Referring to FIG. 4, when the RedCap UE performs BWP switching, BWP1 needs to be switched to BWP2, BWP1 and BWP2 have different bandwidths and different central frequency points, and a BWP switching delay which is spent on BWP switching of the RedCap UE is between BWP1 and BWP2 in FIG. 4.

In some examples, the indication information is carried in radio resource control (RRC) signaling. For example, the RRC signaling is UE Capability Information.

Step 202: the network device receives the indication information sent by the RedCap UE.

In the example of the disclosure, the indication information indicates whether the RedCap UE has the capability of rapid BWP switching, so the network device may determine whether the RedCap UE has the capability of rapid BWP switching according to the received indication information.

In some examples, the indication information indicates whether the RedCap UE has the capability of rapid BWP switching by using one bit. For example, 0 is used for indicating that the RedCap UE does not have the capability of rapid BWP switching, and 1 is used for indicating that the RedCap UE has the capability of rapid BWP switching. Alternatively, 0 is used for indicating that the RedCap UE has the capability of rapid BWP switching, and 1 is used for indicating that the RedCap UE does not have the capability of rapid BWP switching.

It needs to be noted that steps performed by the RedCap UE in the example of the disclosure may independently form a new example, and steps performed by the network device in the example of the disclosure may also independently form a new example.

In the method provided by the example of the disclosure, the RedCap UE may report whether the RedCap UE supports the rapid BWP switching through the indication information, such that the network device determines the capability supported by the RedCap UE, and a new capability report method is provided for the RedCap UE, which ensures that the RedCap UE performs BWP switching according to its own capability, and ensures the reliability of operation of the RedCap UE.

Figure 5:
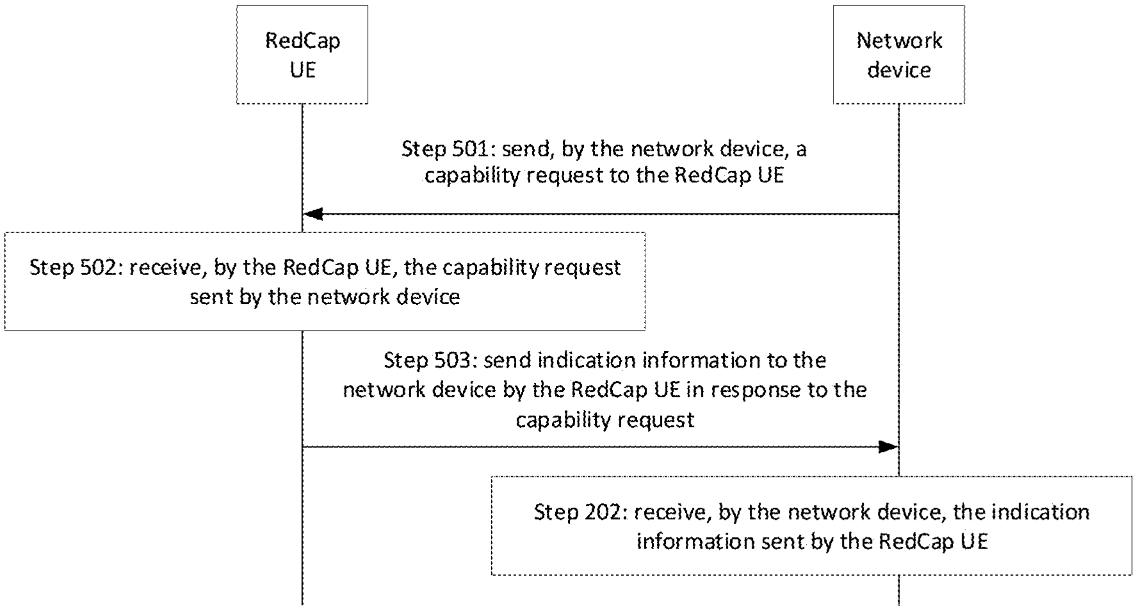
FIG. 5 shows a flowchart of a method for indicating capability provided by an example of the disclosure.

Based on the example shown in FIG. 2, the RedCap UE feeds back the indication information according to a capability request sent by the network device, and please refer to FIG. 5, the method includes the following steps S501-S503.

Step 501: the network device sends the capability request to the RedCap UE.

Step 502: the RedCap UE receives the capability request sent by the network device.

In the example of the disclosure, the network device, if needing to obtain the capability of the RedCap UE, sends the capability request to the RedCap UE, and the RedCap UE, if receiving the capability request, determines that the network device needs to know the capability of the RedCap UE.

Step 503: the RedCap UE sends the indication information to the network device in response to the capability request.

In the example of the disclosure, the RedCap UE determines that the network device needs to know the capability of the RedCap UE according to the received capability request, and thus sends the indication information to the network device in response to the capability request, such that the network device determines whether the RedCap UE has the capability of rapid BWP switching based on the indication information.

In some examples, the RedCap UE not only reports whether the RedCap UE has the capability of rapid BWP switching, but also reports other capabilities of the RedCap UE. For example, an operating frequency band, an operating frequency or other capabilities of the RedCap UE, which is not limited in the example of the disclosure.

According to the method provided by the example of the disclosure, the RedCap UE reports its own capability based on the capability request of the network device, so accuracy of the capability on the RedCap UE is improved.

Based on the example shown in FIG. 2 and FIG. 5, the capabilities of the RedCap UE reported by the indication information are in different levels, and the indication information is described below.

First type: the indication information indicates that the RedCap UE has a UE specific capability, and the UE specific capability refers to the capability of the RedCap UE is suitable for all band combinations.

In the example of the disclosure, the capability possessed by the RedCap UE and indicated by the indication information is the UE specific capability. The UE specific capability refers to the capability of the RedCap UE is for the whole RedCap UE, and the capability possessed by the RedCap UE is suitable for all band combinations.

The RedCap UE supports a plurality of band combinations, and for each band combination in the plurality of band combinations, the capability possessed by the RedCap UE and indicated by the indication information is suitable for each band combination.

For example, if the RedCap UE supports a band combination 1, a band combination 2 and a band combination 3, and the capability indicated by the indication information is also the UE specific capability, it shows that the capability possessed by the RedCap UE is suitable for the band combination 1, the band combination 2 and the band combination 3 supported by the RedCap UE.

According to the method provided by the example of the disclosure, it may be indicated through the indication information that the capability possessed by the RedCap UE is in a terminal level, efficiency of the indicated RedCap UE is improved, and signaling overhead is reduced.

Second type: the indication information indicates that the RedCap UE has a band combination level capability, and the band combination level capability refers to the capability of the RedCap UE is suitable for a target band combination.

In the example of the disclosure, the capability possessed by the RedCap UE and indicated by the indication information is the band combination level capability. The band combination level capability refers to the capability of the RedCap UE is for the band combinations, and the capability possessed by the RedCap UE is suitable for band combinations included in the indication information.

The RedCap UE supports a plurality of band combinations, and for each band combination in the plurality of band combinations, the capability possessed by the RedCap UE and indicated by the indication information is suitable for part of the plurality of band combinations.

For example, if the RedCap UE supports a band combination 1, a band combination 2 and a band combination 3, and the capability indicated by the indication information is also the band combination level capability, it shows that the capability possessed by the RedCap UE is suitable for part of the band combination 1, the band combination 2 and the band combination 3 supported by the RedCap UE.

In some examples, the indication information includes information of whether rapid BWP switching is supported and corresponding to each band combination. For example, if first information is adopted, it shows that the corresponding band combination supports rapid BWP switching, and if second information is adopted, it shows that the corresponding band combination does not support rapid BWP switching In some examples, the first information and the second information are each represented by one bit, or two bits or other numbers of bits.

According to the method provided by the example of the disclosure, a capability supported by each band combination supported by the RedCap UE may be indicated through the indication information, and accuracy of the indicated capability possessed by the RedCap UE is improved.

Figure 6:
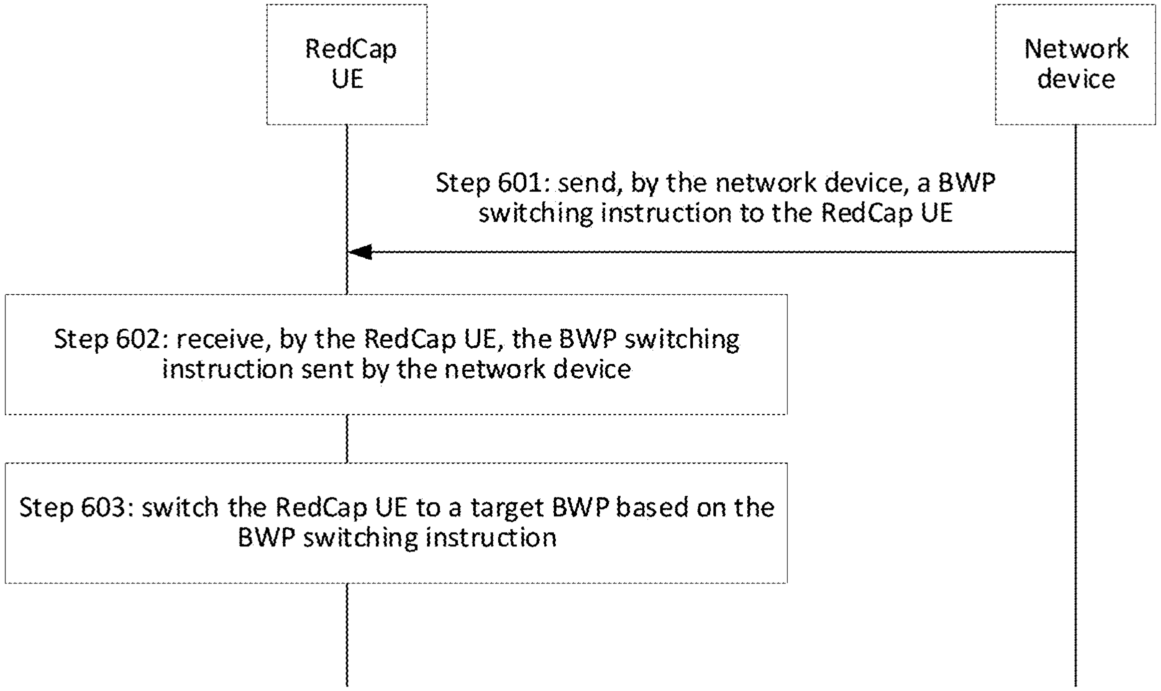
FIG. 6 shows a flowchart of a method for indicating capability provided by an example of the disclosure.

Based on the example shown in FIG. 2 or FIG. 5, the RedCap UE needs to perform BWP switching based on a BWP switching instruction sent by the network device, and please refer to FIG. 6, the method includes the following steps S601-S603.

Step 601: the network device sends the BWP switching instruction to the RedCap UE.

Step 602: the RedCap UE receives the BWP switching instruction sent by the network device.

In the example of the disclosure, the RedCap UE switches BWPs according to indication of the network device, so if the network device needs to control the RedCap UE to switch BWPs, the network device sends the BWP switching instruction to the RedCap UE, and the RedCap UE receives the BWP switching instruction sent by the network device.

Step 603: the RedCap UE is switched to a target BWP based on the BWP switching instruction When the RedCap UE receives the BWP switching instruction and obtains a BWP indicated by the BWP switching instruction, the RedCap UE is switched to the target BWP from a current BWP where it is located.

An operation of performing BWP switching by the RedCap UE refers to deactivating the current BWP and activating the target BWP.

In some examples, the BWP switching instruction is RRC signaling, or the BWP switching instruction is DCI signaling.

According to the method provided by the example of the disclosure, the network device indicates through the BWP switching instruction the RedCap UE to be switched to the target BWP, the RedCap UE is switched to the target BWP based on the BWP switching instruction, and accuracy of BWP switching of the RedCap UE is improved.

Based on the example shown in FIG. 2 or FIG. 5, the RedCap UE needs to perform BWP switching according to a timer. In some examples, the RedCap UE is switched to the target BWP in the case that the timer times out, the timer indicating that BWP switching is performed in response to determining that no data transmission is performed within a duration of the timer.

In the example of the disclosure, if the RedCap UE determines that the timer times out, it shows that the RedCap UE does not perform data transmission within the duration of the timer, and the RedCap UE needs to be switched to the target BWP.

In some examples, a moment when the RedCap UE is located on the current BWP is a starting moment of the timer, and if the RedCap UE does not perform data transmission within the duration of the timer, the timer times out. If the RedCap UE performs data transmission within the duration of the timer, the timer is reset and restarts timekeeping till the RedCap UE does not perform data transmission within the duration of the timer, so the timer times out.

In some examples, the duration of the timer is 3 milliseconds (ms), 5 ms or another numerical value.

Figure 7:
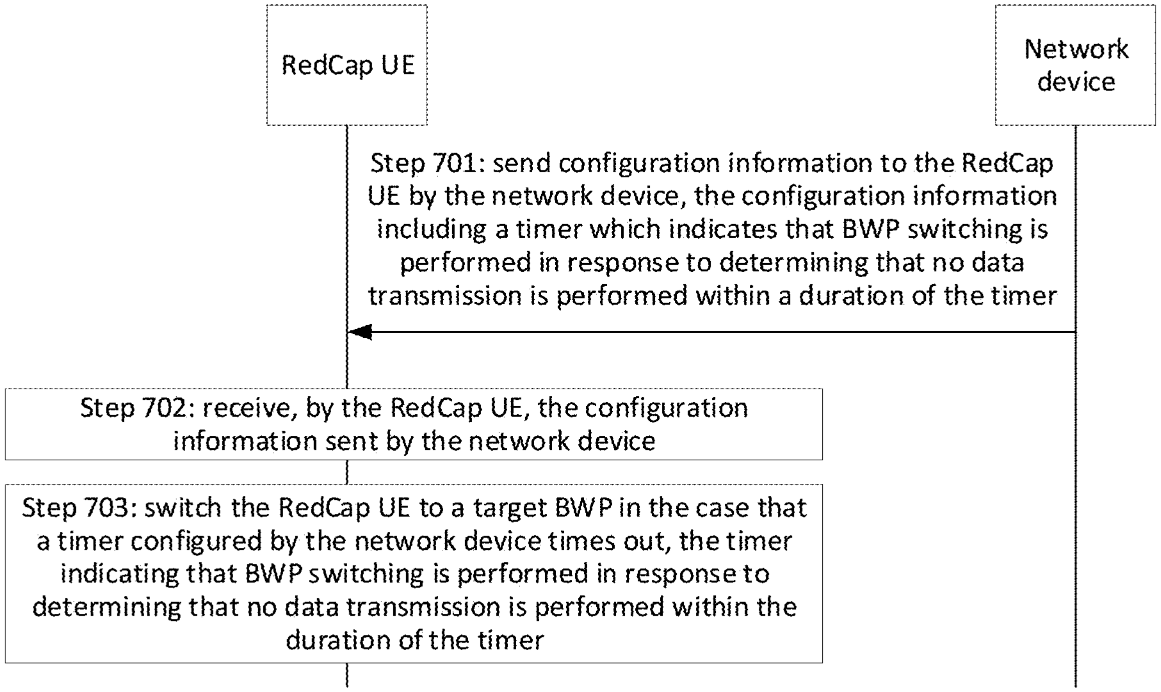
FIG. 7 shows a flowchart of a method for indicating capability provided by an example of the disclosure.

In some examples, the timer of the RedCap UE is configured by the network device, and please refer to FIG. 7 in detail, the method includes the following steps S701-S703.

Step 701: the network device sends configuration information to the RedCap UE, the configuration information including the timer which indicates that BWP switching is performed in response to determining that no data transmission is performed within the duration of the timer.

Step 702: the RedCap UE receives the configuration information sent by the network device.

In the example of the disclosure, the network device sends the configuration information to the RedCap UE so as to configure for the RedCap UE the timer which indicates that BWP switching is performed in response to determining that no data transmission is performed within the duration of the timer, and the RedCap UE performs timekeeping through the timer configured by the network device, so as to perform BWP switching based on the timer.

It needs to be noted that the example of the disclosure is explained merely by taking an example of performing steps 701 to 702 and then performing step 703. In another example, step 703 may be performed directly without performing steps 701 to 702.

Besides, the timer is defined by the communication protocol or configured in another manner.

Step 703: the RedCap UE is switched to the target BWP in the case that the timer configured by the network device times out, the timer indicating that BWP switching is performed in response to determining that no data transmission is performed within the duration of the timer.

Step 703 is the same as steps shown in the above example, which is not repeated here.

It needs to be noted that the example of the disclosure is explained merely by taking an example of switching the RedCap UE to the target BWP according to timeout of the timer. In another example, the network device may also determine that the RedCap UE is switched to the target BWP according to a condition of timeout of the timer.

In the method provided by the example of the disclosure, the RedCap UE may perform BWP switching based on the timer which indicates that BWP switching is performed in response to determining that no data transmission is performed within the duration of the timer, and BWP switching is performed without indication of the network device, so signaling overhead is reduced.

Figure 8:
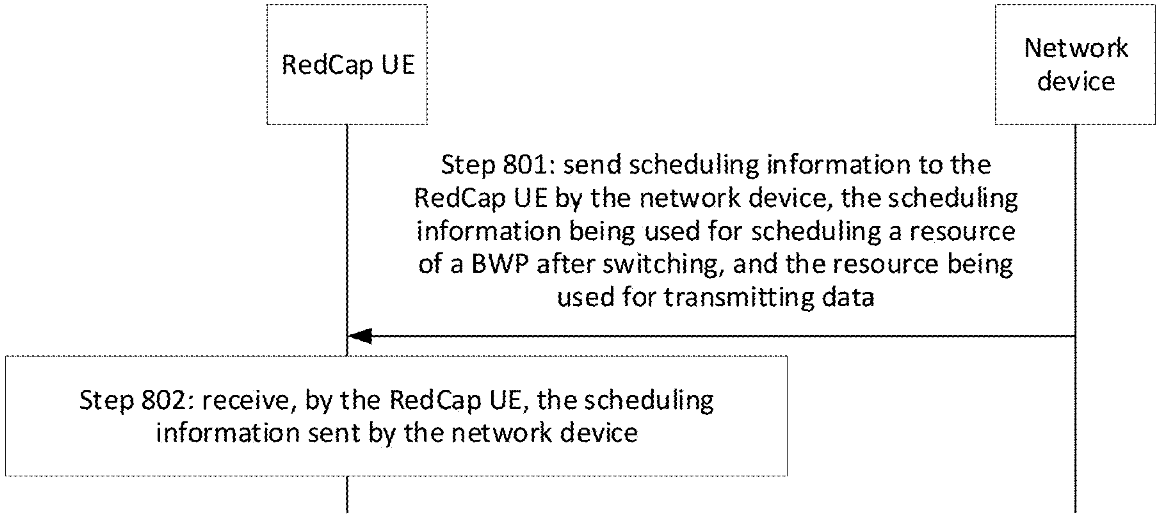
FIG. 8 shows a flowchart of a method for indicating capability provided by an example of the disclosure.

Based on the example shown in FIG. 7, the network device schedules the resources to perform data transmission, and please refer to FIG. 8, the method includes the following steps S801-S802.

Step 801: the network device sends scheduling information to the RedCap UE, the scheduling information being used for scheduling a resource of a BWP after switching, and the resource being used for transmitting data.

In the example of the disclosure, if data transmission needs to be performed between the network device and the RedCap UE, and the network device needs to schedule the resources for the RedCap UE, the network device sends the scheduling information to the RedCap UE, and the resource for transmitting data is scheduled through the scheduling information.

In some examples, the network device determines a moment of sending the scheduling information based on whether the RedCap UE has the capability of rapid BWP switching, so the moment of sending the scheduling information by the network device is described below.

(1) The scheduling information is sent after a sending moment of the BWP switching instruction passes for a first duration or after a timeout moment of the timer passes for the first duration in the case that the indication information indicates that the RedCap UE has the capability for supporting rapid BWP switching.

In the example of the disclosure, if the indication information indicates that the RedCap UE has the capability for supporting rapid BWP switching, it shows that the RedCap UE may complete BWP switching within a short duration, if the network device needs to schedule a resource on the target BWP after switching, the scheduling information is sent after the sending moment of the BWP switching instruction passes for the first duration or after the timeout moment of the timer passes for the first duration, and it may be ensured that a duration for BWP switching is reserved for the RedCap UE.

In some examples, the first duration is defined by the communication protocol. For example, the first duration is 1 ms, 3 ms or other durations.

(2) The scheduling information is sent after the sending moment of the BWP switching instruction passes for a second duration or after the timeout moment of the timer passes for the second duration in a case that the indication information indicates that the RedCap UE does not have the capability for supporting rapid BWP switching.

In the example of the disclosure, if the indication information indicates that the RedCap UE does not have the capability for supporting rapid BWP switching, it shows that the RedCap UE cannot complete BWP switching within the short duration, if the network device needs to schedule the resource on the target BWP after switching, the scheduling information is sent after the sending moment of the BWP switching instruction passes for the second duration or after the timeout moment of the timer passes for the second duration, and it may be ensured that the duration for BWP switching is reserved for the RedCap UE.

In some examples, the second duration is defined by the communication protocol. For example, the second duration is 4 ms, 6 ms or other durations.

The first duration is less than the second duration.

In some examples, there is a corresponding relationship between a duration and a switching type.

For example, a switching type 1 corresponds to a duration 1, a switching type 2 corresponds to a duration 2, and a switching type 3 corresponds to a duration 3, then the network device determines a switching type of the RedCap UE so as to determine the corresponding duration, and thus the scheduling information is sent according to the determined duration.

Step 802: the RedCap UE receives the scheduling information sent by the network device.

In the example of the disclosure, the RedCap UE, after receiving the scheduling information sent by the network device, may determine the resource scheduled by the network device according to the scheduling information, and then the RedCap UE may perform data transmission on the resource scheduled by the network device.

In some examples, the network device determines the moment of sending the scheduling information based on whether the RedCap UE has the capability of rapid BWP switching, in this case, the RedCap UE also needs to determine a moment of receiving the scheduling information sent by the network device based on whether it has the capability of rapid BWP switching, so the moment of receiving the scheduling information by the RedCap UE is described below.

(1) The scheduling information sent by the network device is received after a first duration either following a receiving moment of the BWP switching instruction or following the timeout moment of the timer, in the case that the indication information indicates that the RedCap UE has the capability for supporting rapid BWP switching.

In the example of the disclosure, if the RedCap UE has the capability for supporting rapid BWP switching, it shows that the RedCap UE may complete BWP switching within a short duration, if the network device needs to schedule the resource on the target BWP after switching, the scheduling information is sent after the sending moment of the BWP switching instruction passes for the first duration or the timeout moment of the timer passes for the first duration, correspondingly, the RedCap UE receives the scheduling information sent by the network device after the receiving moment of the BWP switching instruction passes for the first duration or the timeout moment of the timer passes for the first duration.

In some examples, the first duration is defined by the communication protocol. For example, the first duration is 1 ms, 3 ms or other durations.

(2) The scheduling information sent by the network device is received after a second duration either following the receiving moment of the BWP switching instruction or following the timeout moment of the timer, in the case that the indication information indicates that the RedCap UE does not have the capability for supporting rapid BWP switching.

The first duration is less than the second duration.

In the example of the disclosure, if the RedCap UE does not have the capability for supporting rapid BWP switching, it shows that the RedCap UE cannot complete BWP switching within the short duration, if the network device needs to schedule the resource on the target BWP after switching, the scheduling information is sent after the sending moment of the BWP switching instruction passes for the second duration or after the timeout moment of the timer passes for the second duration, correspondingly, the RedCap UE receives the scheduling information sent by the network device after the receiving moment of the BWP switching instruction passes for the second duration or after the timeout moment of the timer passes for the second duration.

In some examples, the second duration is defined by the communication protocol. For example, the second duration is 4 ms, 6 ms or other durations.

In the method provided by the example of the disclosure, the RedCap UE may determine the resource of the target BWP scheduled by the network device through the received scheduling information sent by the network device, then the data transmission may be performed between the RedCap UE and the network device, and the reliability of the data transmission between the RedCap UE and the network device is ensured.

It needs to be noted that the above example may be split to form a new example or combined with another example to form a new example, and the disclosure does not limit a combination between the examples.

Figure 9:
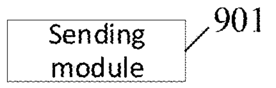
FIG. 9 shows a block diagram of an apparatus for indicating capability provided by an example of the disclosure.

FIG. 9 shows a block diagram of an apparatus for indicating capability provided by an example of the disclosure. The apparatus is configured on a terminal, referring to FIG. 9, including:

a sending module 901, configured to send indication information to a network device, the indication information indicating whether the RedCap UE has a capability for supporting rapid BWP switching, and the rapid BWP switching referring to BWP switching for changing central frequency point.

Figure 10:
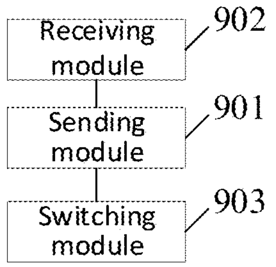
FIG. 10 shows a block diagram of an apparatus for indicating capability provided by an example of the disclosure.

In some examples, referring to FIG. 10, the apparatus further includes:

a receiving module 902, configured to receive a capability request sent by the network device;

the sending module 901 being configured to send the indication information to the network device in response to the capability request.

In some examples, the indication information indicates that the RedCap UE has a UE specific capability, and the UE specific capability refers to the capability of the RedCap UE is suitable for all band combinations.

In some examples, the indication information indicates that the RedCap UE has a band combination level capability, and the band combination level capability refers to the capability of the RedCap UE is suitable for a target band combination.

In some examples, the indication information is carried in RRC signaling.

In some examples, referring to FIG. 10, the apparatus further includes:

a receiving module 902, configured to receive a BWP switching instruction sent by the network device; and a switching module 903, configured to switch to a target BWP based on the BWP switching instruction.

In some examples, referring to FIG. 10, the apparatus further includes:

a switching module 903, configured to switch to a target BWP in the case that a timer times out, the timer indicating that BWP switching is performed in response to determining that no data transmission is performed within a duration of the timer.

In some examples, the apparatus further includes:

a receiving module 902, configured to receive scheduling information sent by the network device, the scheduling information being used for scheduling a resource of a BWP after switching, and the resource being used for transmitting data.

In an implementation, the receiving module is further configured to:

receive scheduling information sent by the network device after a first duration either following a receiving moment of the BWP switching instruction or following a timeout moment of the timer, in the case that the indication information indicates that the RedCap UE has the capability for supporting rapid BWP switching; or receive the scheduling information sent by the network device after a second duration either following the receiving moment of the BWP switching instruction or following the timeout moment of the timer, in the case that the indication information indicates that the RedCap UE does not have the capability for supporting rapid BWP switching;

where the first duration is less than the second duration.

In some examples, the first duration and the second duration are defined by a communication protocol.

In some examples, a bandwidth supported by the RedCap UE is less than 20 MHz in the case of FR1 and less than 100 MHz in the case of FR2.

It needs to be noted that when the apparatus provided by the above example implements the functions, dividing of the above functional modules is described as an example, in actual application, the above functions may be completed by different functional modules according to demands, namely, an internal structure of a device is divided into different functional modules, so as to complete all or part of the above described functions. Besides, the apparatus provided by the above example and the method example belong to the same concept, and its specific implementation process refers to the method example in detail, which is not repeated here.

Figure 11:
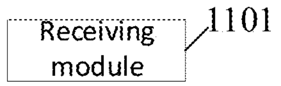
FIG. 11 shows a block diagram of an apparatus for indicating capability provided by an example of the disclosure.

FIG. 11 shows a block diagram of an apparatus for indicating capability provided by an example of the disclosure. The apparatus is configured on a network device, referring to FIG. 11, including:

a receiving module 1101, configured to receive indication information sent by a RedCap UE, the indication information indicating whether the RedCap UE has a capability for supporting rapid BWP switching, and the rapid BWP switching referring to BWP switching for changing central frequency point.

Figure 12:
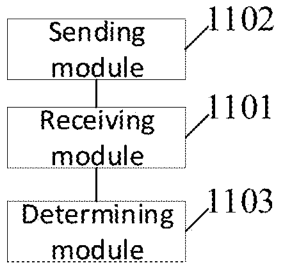
FIG. 12 shows a block diagram of an apparatus for indicating capability provided by an example of the disclosure.

In some examples, referring to FIG. 12, the apparatus further includes:

a sending module 1102, configured to send a capability request to a RedCap UE;

the receiving module 1101 being further configured to receive the indication information sent by the RedCap UE, and the indication information being sent by the RedCap UE in response to the capability request.

In some examples, the indication information indicates that the RedCap UE has a UE specific capability, and the UE specific capability refers to the capability of the RedCap UE is suitable for all band combinations.

In some examples, the indication information indicates that the RedCap UE has a band combination level capability, and the band combination level capability refers to the capability of the RedCap UE is suitable for a target band combination.

In some examples, the indication information is carried in RRC signaling.

In some examples, the apparatus further includes:

a sending module 1102, configured to send a BWP switching instruction to the RedCap UE;

the BWP switching instruction indicating the RedCap UE to be switched to a target BWP.

In some examples, referring to FIG. 12, the apparatus further includes:

a determining module 1103, configured to determine that the RedCap UE is switched to a target BWP in the case that a timer times out, the timer indicating that BWP switching is performed in response to determining that no data transmission is performed within a duration of the timer.

In some examples, the apparatus further includes:

a sending module 1102, configured to send scheduling information to the RedCap UE, the scheduling information being used for scheduling a resource of a BWP after switching, and the resource being used for transmitting data.

In some examples, the sending module 1102 is further configured to:

send the scheduling information after a sending moment of the BWP switching instruction passes for a first duration in the case that the indication information indicates that the RedCap UE has a capability for supporting rapid BWP switching; or send the scheduling information after the sending moment of the BWP switching instruction passes for a second duration in the case that the indication information indicates that the RedCap UE does not have the capability for supporting rapid BWP switching;

where the first duration is less than the second duration.

In some examples, the first duration and the second duration are defined by a communication protocol.

In some examples, a bandwidth supported by the RedCap UE is less than 20 MHz in the case of FR1 and less than 100 MHz in the case of FR2.

It needs to be noted that when the apparatus provided by the above example implements the functions, dividing of the above functional modules is described as an example, in actual application, the above functions may be completed by different functional modules according to demands, namely, an internal structure of a device is divided into different functional modules, so as to complete all or part of the above described functions. Besides, the apparatus provided by the above example and the method example belong to the same concept, and its specific implementation process refers to the method example in detail, which is not repeated here.

Figure 13:
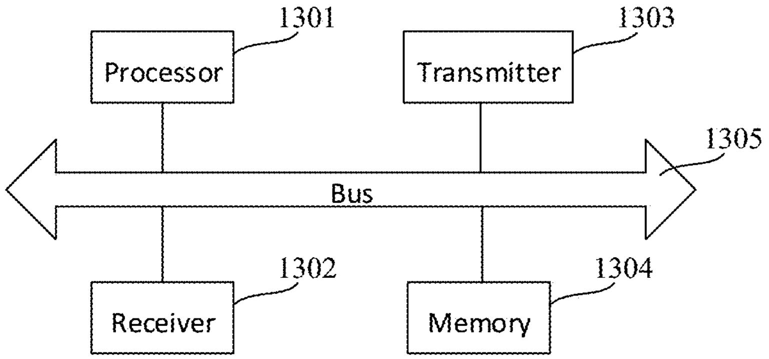
FIG. 13 shows a schematic structural diagram of a communication device provided by an example of the disclosure.

FIG. 13 shows a schematic structural diagram of a communication device provided by an example of the disclosure. The communication device includes: a processor 1301, a receiver 1302, a transmitter 1303, a memory 1304 and a bus 1305.

The processor 1301 includes one or more than one processing core, and the processor 1301 performs various functional applications and information processing by running a software program and modules The receiver 1302 and the transmitter 1303 may be implemented as a communication component, and the communication component may be a communication chip.

The memory 1304 is connected with the processor 1301 through the bus 1305.

The memory 1304 may be configured to store at least one program code, and the processor 1301 is configured to perform the at least one program code so as to implement all steps in the above method example.

Besides, the communication device may be a RedCap UE or a network device. The memory 1304 may be implemented by any type of volatile or non-volatile storage device or their combination, and the volatile or non-volatile storage device includes but is not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an example, a non-transitory computer-readable storage medium is further provided, storing an executable program code, the executable program code is loaded and performed by a processor so as to implement the capability indication method performed by a communication device provided by each of the above method examples.

In an example, a chip is provided, including a programmable logic circuit and/or a program instruction, the chip being configured to implement, when running on a terminal or a network device, the capability indication method provided by each of method examples.

In an example, a computer program product is provided, the computer program product being configured to implement, when performed by a processor of a terminal or a network device, the capability indication method provided by each of above method examples.

Technical solutions provided by the examples of the disclosure at least include the following beneficial effects.

According to the method, apparatus, device and storage medium provided by the examples of the disclosure, the RedCap UE may report whether the RedCap UE supports the rapid BWP switching through the indication information, such that the network device determines the capability supported by the RedCap UE, and a new method for reporting capability is provided for the RedCap UE, which ensures that the RedCap UE performs BWP switching according to its own capability, and ensures the reliability of operation of the RedCap UE.

Those ordinarily skilled in the art can understand that implementing all or part of steps in the above example may be completed by hardware, or completed by instructioning related hardware through a program, the program may be stored in a non-transitory computer-readable storage medium, and the above mentioned storage medium may be a read-only memory, a magnetic disk, an optical disk or the like.

The foregoing descriptions are merely optional examples of the disclosure, but are not intended to limit the disclosure. Any modification, equivalent replacement, or improvement made within the spirit and principle of the disclosure falls within the protection scope of the disclosure.

The invention claimed is:

1. A method for indicating capability, performed by a reduced capability (RedCap) user equipment (UE) and comprising:

sending indication information to a network device, wherein the indication information indicates whether the RedCap UE has a capability for supporting rapid bandwidth part (BWP) switching, and the rapid BWP switching refers to BWP switching for changing a central frequency point;

the indication information indicates that the RedCap UE has a UE specific capability, and the UE specific capability refers to the capability of the RedCap UE being suitable for all band combinations;

or the indication information indicates that the RedCap UE has a band combination level capability, and the band combination level capability refers to the capability of the RedCap UE being suitable for a target band combination;

wherein the method further comprises:

receiving configuration information sent by the network device, wherein the configuration information comprises a timer which indicates that the BWP switching is performed in response to determining that no data transmission is performed within the duration of the timer.

2. The method according to claim 1, wherein sending the indication information to the network device comprises:

receiving a capability request sent by the network device; and sending the indication information to the network device in response to the capability request.

3. The method according to claim 1, wherein the indication information is carried in radio resource control (RRC) signaling.

4. The method according to claim 1, wherein the method further comprises:

receiving a BWP switching instruction sent by the network device; and switching to a target BWP based on the BWP switching instruction.

5. The method according to claim 1, wherein the method further comprises:

switching to a target BWP in a case that the timer times out, wherein the timer indicates that the BWP switching is performed in response to determining that no data transmission is performed within a duration of the timer.

6. The method according to claim 4, wherein the method further comprises:

receiving scheduling information sent by the network device, wherein the scheduling information is used for scheduling a resource of a BWP after switching, and the resource is used for transmitting data.

7. The method according to claim 6, wherein receiving the scheduling information sent by the network device comprises:

receiving the scheduling information sent by the network device after a first duration either following receiving the BWP switching instruction or following a timer times out, in a case that the indication information indicates that the RedCap UE has the capability for supporting rapid BWP switching;

or receiving the scheduling information sent by the network device after a second duration either following receiving the BWP switching instruction or following the timer times out, in a case that the indication information indicates that the RedCap UE does not have the capability for supporting rapid BWP switching, wherein the first duration is less than the second duration.

8. The method according to claim 1, wherein a bandwidth supported by the RedCap UE is less than 20 megahertz (MHz) in a case of a frequency range (FR) 1 and less than 100 MHz in a case of FR2.

9. The method according to claim 1, wherein the indication information comprises information of whether the rapid BWP switching is supported corresponding to each band combination.

10. A method for indicating capability, performed by a network device and comprising:

receiving indication information sent by a reduced capability (RedCap) user equipment (UE), wherein the indication information indicates whether the RedCap UE has a capability for supporting rapid bandwidth part (BWP) switching, and the rapid BWP switching refers to BWP switching for changing a central frequency point;

the indication information indicates that the RedCap UE has a UE specific capability, and the UE specific capability refers to the capability of the RedCap UE being suitable for all band combinations;

or the indication information indicates that the RedCap UE has a band combination level capability, and the band combination level capability refers to the capability of the RedCap UE being suitable for a target band combination;

wherein the method further comprises:

sending configuration information to the RedCap UE, wherein the configuration information comprises a timer which indicates that the BWP switching is performed in response to determining that no data transmission is performed within the duration of the timer.

11. The method according to claim 10, wherein receiving the indication information sent by the RedCap UE comprises:

sending a capability request to the RedCap UE; and receiving the indication information sent by the RedCap UE, wherein the indication information is sent by the RedCap UE in response to the capability request.

12. The method according to claim 10, wherein the indication information is carried in radio resource control (RRC) signaling.

13. The method according to claim 10, wherein the method further comprises:

sending a BWP switching instruction to the RedCap UE, wherein the BWP switching instruction indicates the RedCap UE to be switched to a target BWP.

14. The method according to claim 10, wherein the method further comprises:

determining that the RedCap UE is switched to a target BWP in a case that the timer times out, wherein the timer indicates that the BWP switching is performed in response to determining that no data transmission is performed within a duration of the timer.

15. The method according to claim 13, wherein the method further comprises:

sending scheduling information to the RedCap UE, wherein the scheduling information is used for scheduling a resource of a BWP after switching, and the resource is used for transmitting data.

16. The method according to claim 15, wherein sending the scheduling information to the RedCap UE comprises:

sending the scheduling information after a first duration following sending the BWP switching instruction or after the first duration following a timer times out, in a case that the indication information indicates that the RedCap UE has the capability for supporting rapid BWP switching;

or sending the scheduling information after a second duration following sending the BWP switching instruction or after the second duration following the timer times out, in a case that the indication information indicates that the RedCap UE does not have the capability for supporting rapid BWP switching, wherein the first duration is less than the second duration.

17. The method according to claim 10, wherein a bandwidth supported by the RedCap UE is less than 20 MHz in a case of FR1 and less than 100 MHz in a case of FR2.

18. A network device, comprising:

one or more processors; and a transceiver connected with the one or more processors;

wherein the one or more processors are collectively configured to load and perform an executable instruction so as to implement the method for indicating capability according to claim 10.

19. The method according to claim 10, wherein a starting moment of the timer is a moment when the RedCap UE is located on a current BWP.

20. A reduced capability (RedCap) user equipment (UE), comprising:

one or more processors; and a transceiver connected with the one or more processors;

wherein the one or more processors are collectively configured to load and perform an executable instruction so as to implement:

sending indication information to a network device, wherein the indication information indicates whether the RedCap UE has a capability for supporting rapid bandwidth part (BWP) switching, and the rapid BWP switching refers to BWP switching for changing a central frequency point;

the indication information indicates that the RedCap UE has a UE specific capability, and the UE specific capability refers to the capability of the RedCap UE being suitable for all band combinations;

or the indication information indicates that the RedCap UE has a band combination level capability, and the band combination level capability refers to the capability of the RedCap UE being suitable for a target band combination;

wherein the one or more processors are further collectively configured to load and perform an executable instruction so as to implement:

receiving configuration information sent by the network device, wherein the configuration information comprises a timer which indicates that the BWP switching is performed in response to determining that no data transmission is performed within the duration of the timer.

* * * * *